United States Patent [19]

Mowles

[11] 4,275,661

[45] Jun. 30, 1981

[54] RAILWAY CAR LUBRICATED CENTER BEARING

[75] Inventor: Kenneth L. Mowles, Roanoke, Va.

[73] Assignee: Hennessy Products, Inc., Chambersburg, Pa.

[21] Appl. No.: 56,781

[22] Filed: Jul. 11, 1979

[51] Int. Cl.³ .................. B61F 5/16; B61F 5/50; F16C 17/04; F16C 33/74
[52] U.S. Cl. .................. 105/199 C; 105/189; 308/137
[58] Field of Search .................. 105/199 C, 189; 308/135, 136, 137

[56] References Cited

U.S. PATENT DOCUMENTS

| Re. 27,651 | 5/1973 | Artzer et al. | 308/137 |
|---|---|---|---|
| 1,770,982 | 7/1930 | Jacobs | 308/137 |
| 2,481,695 | 9/1949 | Scott | 308/137 |
| 2,662,799 | 12/1953 | Schaefer | 308/136 |
| 2,871,069 | 1/1959 | Weber | 308/135 |
| 3,170,740 | 2/1965 | Smith | 308/137 |
| 3,264,215 | 8/1966 | Smith et al. | 105/199 C X |
| 3,346,302 | 10/1967 | Robinson et al. | 308/137 |
| 3,466,102 | 9/1969 | Goodwyn | 308/137 |
| 3,549,217 | 12/1970 | Watson | 308/137 |

Primary Examiner—John P. Silverstrim
Assistant Examiner—Howard Beltran
Attorney, Agent, or Firm—F. Travers Burgess

[57] ABSTRACT

A lubricating device for railway car center plates comprises an annular disc of hardened steel plate having a maximum diameter slightly less than the diameter of the truck center plate and an inside diameter substantially greater than the center plate center pin holes, the annular disc being of substantially harder steel than the opposed surfaces of conventional truck and body center plates. The plate is enveloped in a viscous lubricant and is formed with a plurality of holes distributed generally uniformly throughout its surface area and these holes are also filled with lubricant, such that upon relative rotation between the truck and body center plates and during relative radial movements of the annular disc with respect to the truck and body center plates accommodated by horizontal clearance between the periphery of the annular disc and the truck center plate side walls, lubricant is distributed between the top and bottom surfaces of the plate respectively and the body and truck center plate surfaces. Preferably the steel plate is encapsulated in a disintegratable plastic wrapping filled with the lubricant and the entire package is inserted bodily between the truck and body center plate. An annular sealing gasket of elastomeric material is compressed between the rim of the truck center plate and the body center plate.

13 Claims, 4 Drawing Figures

RAILWAY CAR LUBRICATED CENTER BEARING

BACKGROUND OF THE INVENTION

Field of the Invention

The invention relates to railway rolling stock and consists particularly in a device for lubricating center plates swivelly mounting railway car bodies on their trucks.

The Prior Art

Because of several factors including higher train speeds and heavier loads, unlubricated and inadequately lubricated railway truck center plates frequently incur excessive wear and breaking out fore and aft. For reducing wear on center plates, steel plates imperforate, except for the center pin hole, have frequently been applied to center plates, and non-metallic lubricant discs have also been applied between the opposed surfaces of the truck and body center plates, as exemplified by E. P. Smith et al U.S. Pat. No. 3,264,215. The imperforate steel plates, while resisting wear, do not facilitate lubrication of the center plates to which they are applied. Most lubricant discs of which I am aware are unsatisfactory because, after a relatively short period of use, they are ground up by the relative rotational movements of the truck and body center plates and disintegrate into a powdery substance which disappears from the truck center plate. Several patents disclose the use of a plurality of perforate discs between opposed relatively rotatable members for the purpose of supplying lubricant to the relatively rotatable surfaces. Of these patents, G. C. Schaefer U.S. Pat. No. 2,662,799 is directed to a fifth wheel for tractor trailers and the like and L. E. Weber U.S. Pat. No. 2,871,069 is directed to a self-lubricating and rattle preventing washer for parts which, though readily movable, may be only occasionally shifted, such as the bows and levers of convertible tops, the wheels of baby carriages, children's wagons and toys. The Schaefer patent does not disclose what material the perforated discs are made of and does not make it clear that they are in load-supporting relation with the relatively rotatable upper part of the upper fifth wheel, and the Weber patent does not contemplate using the non-metallic discs in vertical load-supporting relation to the relatively rotatable parts and specifies that the discs are of molded pliable plastic material.

SUMMARY OF THE INVENTION

The invention provides a lubricant device for railway car center plates comprising a hardened steel disc for positioning between the opposed horizontal surfaces of truck and body center plates, the disc being perforated uniformly throughout its area and coated with lubricant on both of its upper and lower horizontal faces with the perforations also filled with lubricant, such that relative rotational movement and relative radial movements of the truck and body center plates with respect to each other will cause corresponding movements of the perforated plate and thus distribute lubricant on the opposed surfaces of the truck and body center plates.

As a result of the use of hardened steel, the disc has a long, useful life without deformation or perceptible wear, throughout which it functions as a retainer for lubricant capable of lubricating both the opposed horizontal and vertical surfaces of the truck and body center plates.

The invention also provides means for sealing the space between the truck and body center plates to prevent the flow of air between these parts and thereby reduce oxidation of the opposing surfaces, to reduce evaporation of oil from the grease in the lubricant, and to exclude moisture and thereby inhibit rust.

Among the objects and advantages of the invention are the following:

In a center plate to which the invention is applied, four surfaces, i.e., the bottom of the body center plate, the top and bottom of the steel disc, and the bottom of the truck center plate are lubricated instead of only two surfaces, as is the case when an imperforate disc is used or when no disc is used. The likelihood of metal to metal contact is thereby reduced one-half with consequent doubling of the life and lubricating properties of the center plate as compared with those with imperforate discs or no discs.

The perforations in the disc help the disc to accommodate to unevenness and irregularities in the opposed surfaces of the body and truck center plates and thus reduce the likelihood of breaks across the disc resulting from uneven contact surfaces.

By making the disc approximately $\frac{1}{8}$" less in diameter than the truck center plate, radial sliding movement of the disc in the center plate is permitted, thus distributing the lubricant concentrated in the perforations to different parts of the center plate horizontal surfaces. Such movement occurs when a car is subjected to a sudden jerk as during braking, humping, rounding curves and the like, and the disc will move radially under such conditions with respect to whichever of the body or truck center plate surfaces it has the least resistance, such that in any event the surfaces between which such movement takes place, will be lubricated, thus substantially reducing wear under such conditions. In conventional center plates, the mating surfaces would rub against each other under conditions resulting in much greater or more pronounced wear.

The use of hard metal in the disc of the invention reduces cold flow and increases wear-resistance of its surfaces. In a conventional center plate in which the truck and body parts of substantially the same hardness rub against each other, both parts do not wear uniformly, with galling normally occuring between the surfaces. Although when the invention is applied to a center plate, the softer material of the center plate will wear at a faster rate than the hard material of the disc, the resultant wear will be less than that occurring between two substantailly soft surfaces.

DETAILED DESCRIPTION OF THE INVENTION

Figure 1:
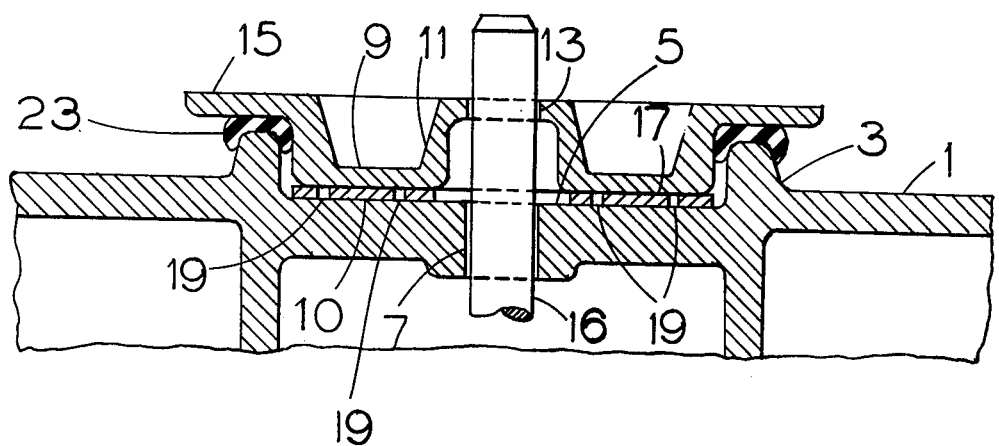
FIG. 1 is a transverse vertical sectional view, taken along line 1—1 of FIG. 2, of a truck and body center plate assembly incorporating the invention, showing adjacent portions of the truck bolster.

The numeral 1 denotes a portion of a railway truck bolster of cast steel construction, at the center of which is formed a truck center plate defined by an upstanding circular rim 3 and having an upwardly facing bottom surface 5 at a slightly lower level than the adjacent portions of the bolster top wall, the central portion of bottom surface 5 being formed with a cylindrical center pin hole 7.

A body center plate, also of cast steel construction, comprises a hollow annular boss 9, the upwardly recessed central portion 11 of which is formed with a center pin hole 13, the entire structure being bounded by a flange 15 to facilitate securement to the car body bolster (not shown). The usual center pin extends through truck and body center plate center pin holes 7 and 13.

To distribute lubricant and reduce wear between the relatively rotatably slidably engaged upwardly facing bottom surface 5 of the truck center plate and downwardly facing bottom surface 10 of the body center plate, an annular disc 17 which is perforated throughout its area by holes 19 is positioned between the truck center plate upwardly facing surface 5 and the downwardly facing surface 10 of body center plate annular boss 9. Disc 17 is formed of a hard steel plate, preferably about ¼ inch thick and with a hardness of 275–325 Brinell (3000 KG). Its diameter is slightly, preferably about ½ 178 inch, less than the inside diameter of the truck center plate rim 3 so as to permit some slight radial movement of the disc relative to the opposed surfaces of the truck and body center plates. Perferably the disc is chrome plated to a thickness of approximately 0.014 inch to inhibit oxidation and improve the wearing characteristics of the disc. Prior to insertion in the truck center plate, the entire disc is enveloped in a lubricant material 20 which also fills holes 19.

Preferably disc 17 forms part of a lubricator package in which a suitable quantity of lubricant 20 surrounds the entire disc, with the disc and surrounding lubricant being encapsulated in a sealed disintegratable plastic envelope 21, such as a heat-sealed envelope of polyethylene film. The entire lubricating package may be inserted into the truck center plate and the body lowered until the body center plate rests on the package. Prior to lowering the car body onto the truck, a sealing ring 23 made of elastomeric foam material is positioned around the car body center plate boss 9 for the purpose of preventing the escape of lubricant from the space between the opposing truck and car body center plates when the truck and car body center plates are mated. Also, this sealing ring restricts the air flow and moisture from entering this area which minimizes oxidation and rust and evaporation of lubricant. The elastomeric foam material 23 is compressed between body center plate flange 15 and truck center plate rim 3 and is thereby deformed to the shape shown in FIG. 1 so as to effect a tight seal between these parts, without interfering with relative rotational or radial movements of the body center plate with respect to the truck center plate, because of the yieldability in shear of the elastomeric foam.

Figure 2:
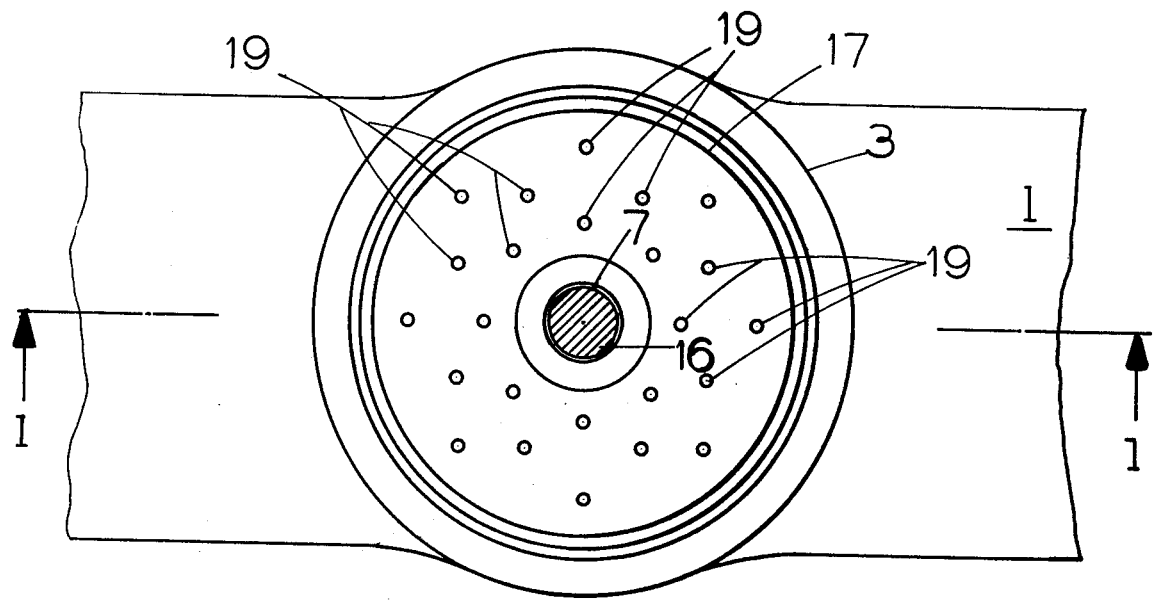
FIG. 2 is a plan view of the truck center plate and adjacent portions of the truck bolster, showing the invention applied to the truck center plate.
Figure 3:
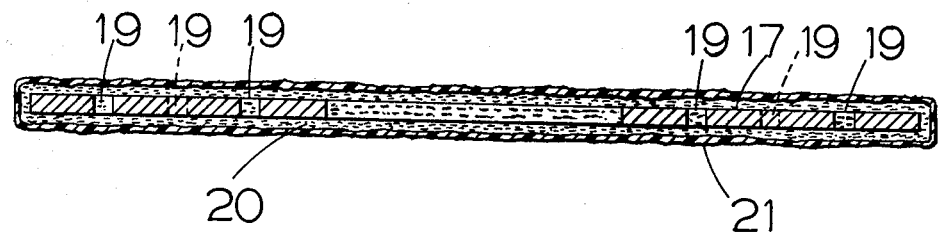
FIG. 3 is an enlarged diametral sectional view of the wrapped pre-lubricated disc incorporating the invention.
Figure 4:
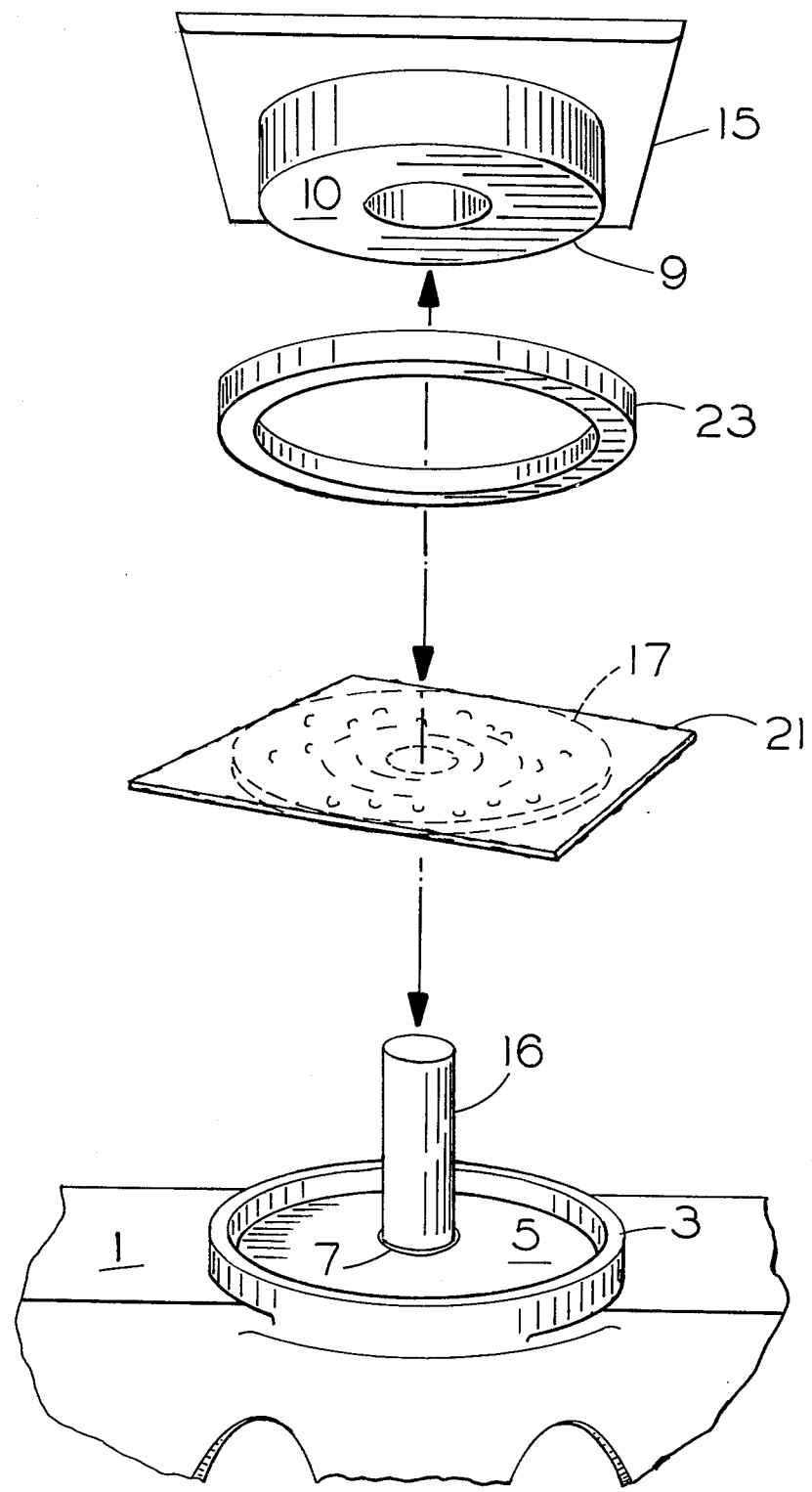
FIG. 4 is an exploded view showing the truck and body center plates, the lubricating package, the center plate sealing ring and the method of applying the invention to a truck and body center plate assembly.

As best seen in FIG. 2, holes 19 perforated to disc 17 are of sufficient size to receive and contain a substantial quantity of lubricant material. Approximately ⅜" diameter has been found to be a satisfactory size for this purpose. Holes 19 are arranged in three circular rows substantially equally spaced apart radially between the interior and exterior rims of discs 17. The inner and outer circular rows both have eight equiangular holes 19 arranged in radial alignment with each other and the middle row has eight holes 19 also equiangularly spaced and positioned on radii of the disc bisecting the angles between the radii on which the holes of the inner and outer rows are positioned. It will be understood, of course, that other symmetrical and uniform distribution of the lubricant holes might be satisfactory.

Application and operation of the device are as follows:

The device is applied to a car by lifting the body off the trucks sufficiently to insert the lubricator package 17, 19, 21 in the truck center plate 3, 5 and to apply elastomeric foam ring 23 to the body center plate 9–15. The body is thereupon lowered onto the truck, such that the bottom surface 10 of the body center plate is supported directly on the lubricant package, and elastomeric foam ring 23 is compressed into sealing engagement between the body center plate flanges 15 and the outer periphery of body center plate annular boss 9 and truck center plate rim 3 to provide a seal against the admission of air flow and foreign matter into the space between the truck and body center plates and to prevent the escape of lubricant from this space. The side bearings are then adjusted to provide the proper height.

During operation of the car as the trucks swivel in rounding curves, the envelope gradually disintegrates and the steel disc 17 will rotate with respect to either one or both of the center plates and during such rotation will cause lubricant from the holes 19 to be distributed on the center plate surface or surfaces with respect to which it rotates. Under some conditions such as during braking, humping and rounding curves and the like, in which the car receives a sudden jerk, the disc may move radially as well as circumferentially with respect to one or the other of the truck or body center plate surfaces and such radial movement will cause distribution of the lubricant from the holes to different parts of the surface with respect to which the disc moves. Because of the additional lubricant distributed to the relatively moving surfaces of the disc and one of the center plates, wear between these parts would be substantially reduced as compared to a conventional truck and body center plate assembly in which the mating surfaces of the truck and body center plates would rub together with resultant greater or more pronounced wear.

The details of the lubricating device may be varied substantially without departing from the spirit of the invention and the exclusive use of such modifications as come within the scope of the appended claims is contemplated.

I claim:

1. In combination with a railway car center plate assembly comprising a truck-mounted part forming an upwardly open cylindrical recess having a flat upwardly-facing bottom surface and a body-mounted part having a depending cylindrical boss rotatably receivable in the truck recess and having a flat downwardly-facing bottom surface, a hard metal disc disposed between the opposed horizontal surfaces of said boss and said recess, said disc having smooth top and bottom surfaces and being formed with a plurality of perforations, said disc being of sufficient hardness to retain its original configuration under load during operation of the railway car, and a quantity of lubricant material substantially surrounding said disc and filling said perforations, whereby upon relative rotation between said truck- and body-mounted parts, lubricant material on said plate and within the perforations therethrough is uniformly distributed to at least one of the opposed horizontal surfaces of said truck- and body-mounted parts, thereby reducing friction and consequent wear and facilitating truck swivel.

2. The combination according to claim 1, wherein said disc is formed of hardened steel substantially harder than the truck- and body-mounted center plate parts.

3. The combination according to claim 1, wherein said body-mounted part has a horizontal surface projecting outwardly from said cylindrical boss, including an annulus of resilient material surrounding said cylindrical boss and compressed between said horizontal surface to said body-mounted part and the rim of said truck-mounted part to seal the opposing surfaces of said parts from their external environment.

4. The combination according to claim 1, wherein said disc is chrome plated, whereby to inhibit oxidation and improve its wearing characteristics.

5. The combination according to claim 1, wherein said disc is of less diameter than said truck-mounted center plate part, whereby said disc is enabled to shift radially of said center plate parts and thereby increase the distribution of lubricant material thereto.

6. The combination according to claim 5, wherein said disc is of annular shape.

7. The combination according to claim 5, including a disintegratable plastic envelope encapsulating said disc and the surrounding lubricant material.

8. The combination according to claim 7, wherein said plastic envelope is formed of heat-sealed polyethylene film.

9. A lubricating assembly for insertion between opposed horizontal surfaces of railway truck and body center plate parts comprising a circular disc of hardened steel, said disc being formed with a plurality of perforations substantially uniformly spaced through its area, said disc being of sufficient hardness to retain its original configuration under load during operation of the center plate parts, a sealed disintegratable plastic envelope encapsulating said disc, and a quantity of lubricant material surrounding said disc and filling the perforations therein also contained in said envelope to lubricate said center plate parts after the plastic envelope disintegrates.

10. A lubricating assembly according to claim 9, wherein said disc is of slightly less diameter than the truck part of the center plate for which it is intended.

11. A lubricating assembly according to claim 10, wherein said disc is of annular shape.

12. A lubricating assembly according to claim 10, wherein said plastic envelope is formed of disintegratable material.

13. A lubricating assembly according to claim 12, wherein said plastic envelope is formed of heat-sealed polyethylene film.

* * * * *